F. HAUSER.
COMBINED RAIL CHAIR AND FISH PLATE.
APPLICATION FILED MAR. 26, 1908.
906,015.
Patented Dec. 8, 1908.
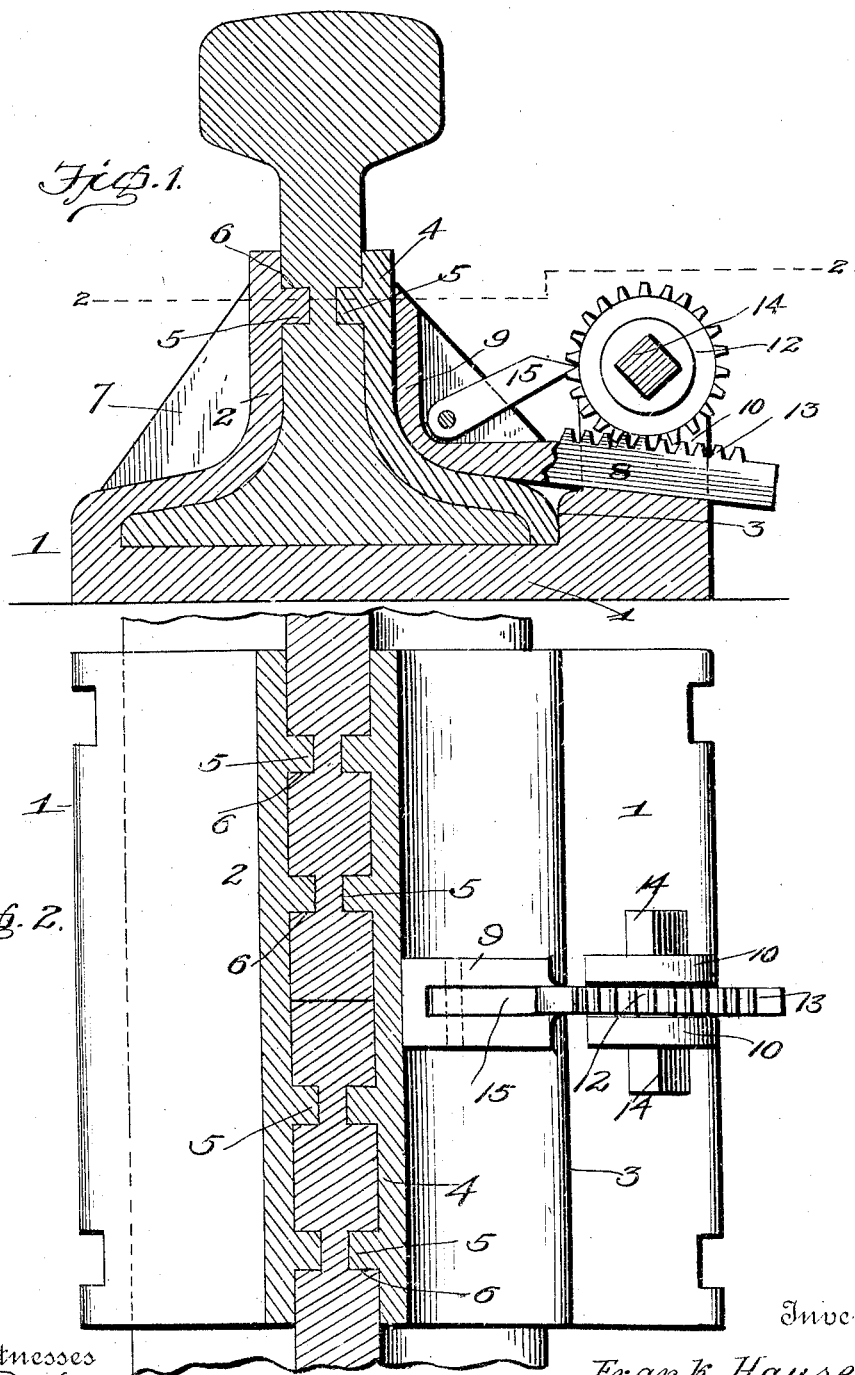
Witnesses
C. E. Hunt.
C. H. Gresbauer.
Inventor
Frank Hauser
By H. B. Willson & Co.
Attorneys

# UNITED STATES PATENT OFFICE.

FRANK HAUSER, OF LYCIPPUS, PENNSYLVANIA.

COMBINED RAIL-CHAIR AND FISH-PLATE.

No. 906,015.

Specification of Letters Patent.

Patented Dec. 8, 1908.

Application filed March 26, 1908. Serial No. 423,461.

*To all whom it may concern:*

Be it known that I, FRANK HAUSER, a citizen of the United States, residing at Lycippus, in the county of Westmoreland and State of Pennsylvania, have invented certain new and useful Improvements in a Combined Rail-Chair and Fish-Plate; and I do declare the following to be a full, clear, and exact description of the invention, such as will enable others skilled in the art to which it appertains to make and use the same.

This invention relates to improvements in combined rail chairs and fish plates.

The object of the invention is to provide a device of this character by means of which a firm support and secure joint is provided for the meeting ends of the rails.

A further object of the invention is to provide a combined chair and fish plate adapted to be secured to the rails without the use of bolts, and which may be adjusted to take up wear and readily detached to permit the removal of the rails.

With these and other objects in view, the invention consists of certain novel features of construction, combination and arrangement of parts as will be described and particularly pointed out in the appended claims.

In the accompanying drawings, Figure 1 is a cross sectional view of the device, showing the same applied to a rail; and Fig. 2 is a horizontal sectional view on the line 2—2 of Fig. 1.

In the embodiment of the invention, I provide a chair comprising a base plate, 1, one edge of which is extended upwardly and has formed integrally therewith a fish plate, 2, which is adapted to engage the flange and web of one side of the rails. On the upper side of the base plate, adjacent to its opposite edge is formed a stop flange, 3, which is adapted to be engaged by the lower edge of an adjustable fish plate, 4. The plate, 4, is adapted to be engaged with the flange and web of the rail on the opposite side from the plate, 2.

On the inner sides of the fish plates, 2 and 4 is formed a series of oppositely disposed locking studs, 5, which are adapted to engage a series of sockets, or recesses, 6, formed in the opposite sides of the web portion of the rail as shown. The studs, 5, serve to lock the rails against longitudinal or endwise movement. The fish plate, 2, is provided with an integrally formed brace, 7, while adapted to be engaged with the outer side of the fish plate, 4, is a clamping lever, 8, having on its inner end a head, 9, the outer edge of which conforms to the curvature or shape of the outer side of the fish plate, 4, as shown. The clamping lever, 8, rests upon the upper edge of the stop flange, 3, and is adapted to work between integrally formed parallel ears, 10, which project upwardly from the stop flange and have revolubly mounted between their upper ends a gear wheel, 12, the teeth of which are adapted to engage a toothed rack, 13, formed on the upper edge of the lever, 8, whereby when the gear is turned in one direction, the lever will be forced inwardly or outwardly toward or away from the fish plate, 4. The gear wheel, 12, is provided with an operating shaft, having a squared projecting end, 14, adapted to receive a wrench or crank, whereby the same is turned. Pivotally mounted on the head, 9, of the lever, 8, is a pawl, 15, which is adapted to engage the teeth of the gear, 12, and to lock the same against movement.

By means of the clamping lever, 8, and the operating gear, 12, the adjustable fish plate is clamped into forcible engagement with one side of the rails, and the latter are forced into firm engagement with the fixed plate on the opposite side of the chair, thereby securely holding and supporting the meeting ends of the rail sections in the proper position on the ties. The chair may be secured to the ties in any suitable manner, but is here shown as provided in its opposite edges with notches, or recesses, adapted to receive spikes which are driven into the ties to hold the chair in place.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. In a combined chair and fish plate, a base plate, an integrally formed fish plate on one edge of said base plate to engage one side of the rails, an adjustable fish plate to engage the opposite side of the rail, an adjusting lever engaged with said adjustable plate, and a rack and tension adjustment whereby said lever is operated to force said adjustable fish plate into engagement with the rail, substantially as described.

2. In a combined chair and fish plate, a base plate, an integrally formed fish plate along one edge of said base plate to engage the flange and one side of the rails, an adjustable fish plate adapted to engage the opposite side of the rails, locking studs on said fish plates to engage recesses in the opposite sides of the rails, a slidably mounted clamping lever having a rack, a revolubly mounted operating gear adapted to engage said rack, means to hold said gear against movement, substantially as described.

3. In a combined chair and fish plate, a base plate, an integrally formed fish plate on one edge of said base plate to engage one side of the rail ends, a brace on said fish plate, a stop flange on the opposite edge of the base plate, an adjustable fish plate arranged between said stop flange and the adjacent side of the rails, a clamping lever having a head adapted to fit against and conform to the shape of said fish plate, a toothed rack on said lever, a revolubly mounted gear adapted to engage said rack, means whereby said gear is operated, and a locking pawl to hold said gear against movement, substantially as described.

In testimony whereof I have hereunto set my hand in presence of two subscribing witnesses.

FRANK HAUSER.

Witnesses:
MATTHEW MUETHING,
SYLVESTER SCHWAB.